United States Patent Office 2,798,049
Patented July 2, 1957

2,798,049

ALUMINA SOLS AND GELS AND PROCESS OF PRODUCING SAME

John F. White, Medford, Mass., and Dudley A. Williams, Bristol, R. I., assignors to Monsanto Chemical Company, St. Louis, Mo., a corporation of Delaware No Drawing. Application June 21, 1952,
Serial No. 294,915

13 Claims. (Cl. 252—313)

The present invention relates to the preparation of alumina gels and stable, concentrated alumina sols, and to novel alumina gels or sols.

It has been proposed heretofore to prepare alumina sols by partially or completely neutralizing a water solution of an aluminum salt such as aluminum nitrate or aluminum chloride with an alkali metal hydroxide. The resulting sols generally have unsatisfactory shelf or storage life at temperatures between about 70 and 100° F. and consequently have not been employed to any appreciable extent on a commercial scale. It has also been proposed heretofore to evaporate the foregoing sols to a substantially dry state and then remove the salts therefrom by washing to produce a solid material which is peptized with an acid and dispersed in water. While such solid product offers economies in shipping and storage, it is expensive to produce because of the washing and drying steps employed and because of the relatively inefficient recovery of the alumina from the various processing steps.

It is one object of this invention to produce stable alumina sols or water-dispersible alumina gels directly from water-soluble aluminum salts by partial neutralization without removing the electrolytes formed during such neutralization.

It is a further object of this invention to provide stable alumina sols derived from water-soluble aluminum salts, which sols contain inorganic salts of ammonia or of an alkali metal and the anion of such aluminum salt.

It is a further object of this invention to provide an inexpensive process for preparing stable, concentrated alumina aquasols from water-soluble aluminum salts.

Still further objects and advantages of this invention will become apparent from the following description and the appended claims.

The processes of this invention are carried out, in general, by partially neutralizing an aqueous solution of a water-soluble aluminum salt such as aluminum chloride or aluminum nitrate with an alkaline substance such as ammonia in the presence of gelatin. Depending on the concentration of the aluminum salt, the alkaline substance used to provide partial neutralization, the amount of gelatin employed and the stage at which the gelatin is added, it is possible to produce stable sols, or gels which are colloidally dispersible in water at concentrations up to 10% by weight of $Al_2O_3$.

A further understanding of the processes and sols of the present invention will be obtained from the following specific examples which are intended to illustrate this invention but not to limit the scope thereof, parts and percentages being by weight unless otherwise specified.

*Example I*

Two hundred and thirty parts of an aqueous aluminum chloride solution containing sufficient $AlCl_3$ to provide 10.5% of $Al_2O_3$ were mixed with 291 parts of water. Nineteen and four-tenths parts of a 2% aqueous solution of gelatin were added to the aluminum chloride solution, thus providing about 2% of gelatin on the $Al_2O_3$ equivalent of the aluminum chloride in the solution. Then 54.8 parts of finely divided sodium carbonate were added in small portions to the aluminum chloride-gelatin solution, with stirring, at 47° C. over a period of 2.1 hours, after which the small amount of floc which had been formed was peptized, that is, dispersed to the colloidal state, by heating the solution for a period of 3.7 hours at 47° C. Next, 12.3 parts of finely divided sodium bicarbonate were added to the solution in small amounts at 80° C. over a period of 2.7 hours, after which the small amount of floc which had been formed in the solution was dispersed to the colloidal state by heating the solution for a period of 1.8 hours at 80° C. The total amount of sodium carbonate and sodium bicarbonate employed was sufficient to neutralize 84% of the aluminum chloride in the solution. The sol which was obtained, on cooling, contained about 4.0% of hydrated alumina (calculated as $Al_2O_3$), and had a cloudy, grayish white appearance, a pH of about 3.8 and was stable for at least 6 months.

*Example II*

One hundred and twenty eight parts of an aqueous aluminum chloride solution containing 10.5% aluminum chloride (calculated as $Al_2O_3$) were mixed with 182 parts of water. Ten and eight-tenths parts of a 2% aqueous gelatin solution were added to the aluminum chloride solution, thus providing about 2% of gelatin on the $Al_2O_3$ equivalent of the aluminum chloride in the solution. Then 41 parts of 24% aqueous ammonia solution were added in four aliquot portions to the aluminum chloride-gelatin solution, with stirring, at a temperature of 27° C., the ammonia employed being sufficient to neutralize 73% of the aluminum chloride. The small amount of gel lumps which formed in the mixture were broken up into fine particles in the mixture, and the mixture was heated to about 100° C., using steam as the heating medium, until the gel lumps were dispersed to the colloidal state, which was accomplished within about 15 minutes. On cooling, a sol which was stable, without gelation, for periods of 6 months and longer was obtained. This sol had a pH of about 3.6 and an alumina content of about 3.7% (calculated as $Al_2O_3$).

In carrying out the processes of this invention, it is possible to use any water-soluble aluminum salt of aluminum and a strong monobasic mineral acid such as hydrochloric acid or nitric acid, or an organic acid such as acetic acid. The concentration of such salt in water may be varied considerably depending on the final product desired. In those instances where it is desired to obtain a sol directly as the final product, it is usually necessary to employ an aqueous solution which contains less than 10% of the salt (calculated as $Al_2O_3$) by weight. Moreover, if a sol is to be obtained directly, the concentration of salt in solution will depend on the alkaline substance used for partial neutralization of the salt and the degree of partial neutralization. For example, aqueous aluminum chloride solutions containing up to about 10% of the equivalent of $Al_2O_3$ may be 85% neutralized with ammonia to form a sol, but if alkali metal carbonate and bicarbonates are employed instead of ammonia under the same conditions the concentration of the aluminum chloride solution must be reduced to obtain a stable sol directly as the final product.

In some instances it is desirable to obtain a more concentrated product which need not be in the sol state. Thus, in accordance with the present invention, it is possible to provide an alumina aquagel which is dispersible in water by using concentrated aqueous solutions, that is, solutions containing more than 10% of a water-soluble aluminum salt (calculated as $Al_2O_3$). Such alumina gels may be prepared so as to contain varying concentrations of alumina, but it is usually necessary to disperse such gels in water, to form alumina sols, using an amount of water sufficient to provide a final sol containing less than 10% by weight of alumina. However, in any event, it is not necessary or desirable to remove the electrolyte or salt formed during the partial neutralization of the aluminum salt from the alumina gel.

Although the examples illustrate the partial neutralization of the aluminum salts with sodium carbonate and sodium bicarbonate or ammonia to the extent of 84% and 73%, respectively, it is possible to partially neutralize the aluminum salts to a greater or lesser extent depending primarily on the alkaline substance used, the concentration of the aluminum salt solution, the amount of gelatin used and the stage at which the gelatin is added. In general, the amount of alkaline substance used should be sufficient to convert a major portion of the aluminum salt to alumina, and it is preferable to use sufficient alkaline substance to neutralize at least 65% of the aluminum salt. The maximum amount of alkaline substance used varies with the type of final product desired, the specific alkaline substance used and various other factors. In most instances, it is preferable to use an amount of alkaline substance sufficient to neutralize up to 85% of the aluminum salt. However, in some cases it is possible to neutralize up to 88% of the aluminum salt, especially at lower concentrations of such salt.

Various alkaline substances may be used for partially neutralizing the aluminum salts instead of the sodium carbonate and sodium bicarbonate, or ammonia, used in the examples. As examples of such alkaline substances may be mentioned other alkali metal carbonates or bicarbonates, alkali metal hydroxides, strongly alkaline amines and the like. Ammonia is definitely different from other alkaline substances in the processes of this invention, however, in that if floc or gel particles are formed during partial neutralization of the aluminum salt, it is possible to peptize such particles rapidly as by warming the solution when ammonia is used, without using acids. When other alkaline substances such as alkali metal carbonates or bicarbonates, or mixtures thereof are used, and particularly when alkali metal hydroxides are employed, it is usually necessary to peptize any floc or gel particles formed during partial neutralization by prolonged periods of heating at relatively high temperatures of 80 to 100° C. but below the boiling point, and even then minute amounts of acid such as hydrochloric acid may be required to disperse such floc or gel particles to the colloidal state. This heating leads to various possible difficulties such as dehydration of the alumina or the use of more peptizing acid then is necessary or desirable. Hence, ammonia is the preferred alkaline substance for carrying out the partial neutralization of the aluminum salts.

The foregoing disadvantages of the alkaline substances, other than ammonia, may be overcome to some extent by using an alkaline substance such as sodium hydroxide, sodium carbonate or the like during the initial stages of the partial neutralization of the aluminum salts, after which the partial neutralization may be completed with ammonia. Suitable results are also obtained, as illustrated in Example II, by carrying out the first stages of the partial neutralization with sodium carbonate or sodium hydroxide and the final stage of the partial neutralization with sodium bicarbonate.

In carrying out the partial neutralization of the water-soluble aluminum salts, as described herein, it is preferred to stir the solution of such salt to avoid local concentrations of high alkali content, and it is also preferred to add the alkaline substance in relatively small portions and as a finely divided solid or solution. The addition of the alkaline substance is suitably made at normal room temperatures, although for more rapid addition when solutions of hydroxides are used it is preferred to chill the aluminum salt solution to a temperature below room temperature and above the freezing point of the solution prior to the partial neutralization thereof. Temperatures above 60° C. should be avoided in most instances during the addition of the alkaline substance, especially if a stable sol or dispersible gel is desired, since there is some tendency to dehydrate alumina in the solution with the formation of particles which are very difficult to disperse. After all of the alkaline substance has been added warming of the sol is usually desirable to colloidally disperse any floc or gel particles which have formed during the partial neutralization. Generally temperatures between about 50 and 100° C. but below the boiling point are suitable for this purpose. However, stirring is usually necessary at temperatures above 80° C. in order to minimize dehydration of the alumina in floc or gel particles. It is at this stage (peptization or dispersion of floc or gel particles) that the advantages in using ammonia as the alkaline substance are most apparent in that the dispersion of the floc or gel particles to colloidal particles proceeds most rapidly when ammonia is employed for partial neutralization, and peptizing acids are not required.

The gelatin which is used to stabilize the alumina sols described herein may be added at various stages of the formation of the sol. For example, the gelatin may be added to the solution of the aluminum salt, or it may be added at some stage during the partial neutralization of such salt. These procedures are not equivalent, however, and it is possible to produce sols having superior shelf life or stability by incorporating the gelatin in the aluminum salt solution prior to partial neutralization of the salt with an alkaline substance. The gelatin may be incorporated in the aluminum salt solution or it may be added to a partially neutralized aluminum salt (at some stage of the partial neutralization) in various ways. Thus, it may be added as a solid and dissolved, or it may be added in the form of an aqueous solution as illustrated in the examples. The amount of gelatin employed should be sufficient to stabilize the sol which is formed, that is, should be sufficient to increase the shelf life of the sol, and the minimum amount of gelatin required will vary depending on the concentration of the sol, the alkaline substance used for partial neutralization of the aluminum salt and the degree of partial neutralization. In general, satisfactory results are obtained, in most instances, with as little as 1% by weight of gelatin, based on the $Al_2O_3$ equivalent of the aluminum salt, and as low as 0.5% by weight of gelatin may be used when dilute alumina sols are prepared. The maximum amount of gelatin used depends on the desired fluidity of the final sol and the use for which the sol is intended. In most cases a satisfactory upper limit is 25% by weight of gelatin based on the $Al_2O_3$ equivalent of the salt, but even larger amounts of gelatin may be used if the increased viscosity of the sol and the masking effect of the gelatin on the utility of the colloidal alumina particles in the sol is not objectionable.

The soils produced in accordance with the present invention contain from about 0.5 to about 10% by weight of alumina solids (calculated as $Al_2O_3$). However, the present invention is particularly directed to alumina sols containing between about 3 and 10% by weight of alumina. These latter sols have a particularly satisfactory shelf life in contrast to similar sols which do not contain gelatin. As has been pointed out herein, the sols of this invention contain the salt formed by the partial neutralization of the aluminum salt with the alkaline substance, for example, salts such as sodium chloride or nitrate or ammonium chloride or nitrate, depending on the alkaline substance used and the anion present in the aluminum salt. The amount of salt present varies depending on the concentration of aluminum salt and the degree of partial neutralization. In most cases the amount of salt is within the range of about 5 to 38% by weight based on the sol. The sol may be cooled to a point where some of the salt present therein crystallizes and such crystals may be removed from the sol by decantation or filtration or the like. However, such procedure is not essential. The sols of the present invention have a pH below 7 and generally within the range of about 3 to 5 depending primarily on the degree of neutralization.

The colloidally dispersible gels or aquagels of this invention, which are prepared by partial neutralization of relatively concentrated aluminum salt solutions in the presence of gelatin, generally contain above 10% by weight of hydrated alumina, calculated as $Al_2O_3$, and as high as 30% by weight of hydrated alumina (calculated as $Al_2O_3$). Such gels may be diluted with water to a concentration below 10% by weight of hydrated alumina (calculated as $Al_2O_3$) and dispersed by simple stirring to form sols having satisfactory shelf life. These gels contain varying amounts of salts (formed by the partial neutralization of aluminum salt with the alkaline substance) depending on the concentration of the aluminum salt solution used in their preparation and the degree of partial neutralization. In general, such salts are present in amounts between 230 and 400% by weight, based on the alumina ($Al_2O_3$) in the gel. As in the case of the sols, the gels have a pH below 7, and usually between 3 and 5. It is not necessary or desirable to remove the salts from the gels.

The sols of the present invention may be used for various purposes, for example, for treating textile fibers to increase the inter-fiber friction or the manipulative characteristics of the fibers. The sols may also be used for coating glass or for coating molds used in precision casting. Other uses for alumina sols are well known in the art. The gels of this invention may be used to prepare alumina sols, as hereinbefore described.

Various modifications and changes may be made in the sols, gels and processes described herein as will be apparent to those skilled in the art to which this invention appertains without departing from the spirit or intent of this invention. Accordingly, it is not intended to restrict this invention except by the scope of the appended claims.

What is claimed is:

1. A stable, acidic alumina aquasol containing about 1 to 10% by weight of hydrated alumina, calculated as $Al_2O_3$, from about 5 to 38% by weight of ammonium chloride and from 1 to 25% by weight of gelatin based on the $Al_2O_3$ content of said aquasol.

2. A stable, acidic alumina aquasol containing about 1 to 10% by weight of hydrated alumina, calculated as $Al_2O_3$, from about 5 to 38% by weight of sodium chloride and from 1 to 25% by weight of gelatin based on the $Al_2O_3$ content of said aquasol.

3. An acidic alumina aquagel containing 10 to 30% by weight of hydrated alumina, calculated as $Al_2O_3$, from about 230 to 400% by weight, based on said alumina, of a salt selected from the group consisting of ammonium chloride and sodium chloride and from about 1 to 25% by weight of gelatin based on the hydrated alumina, calculated as $Al_2O_3$, said aquagel being dispersible in water by simple stirring to form sols containing less than 10% by weight of hydrated alumina.

4. An acidic alumina aquagel containing 10 to 30% by weight of hydrated alumina, calculated as $Al_2O_3$, from about 230 to 400% by weight, based on said alumina, of ammonium chloride and from about 1 to 25% by weight of gelatin based on the hydrated alumina, calculated as $Al_2O_3$, said aquagel being dispersible in water by simple stirring to form sols containing less than 10% by weight of hydrated alumina.

5. A process of producing stable alumina sols which comprises treating an aqueous solution of from about 1 to 10% by weight of aluminum chloride, calculated as $Al_2O_3$, and from about 0.5 to 25% by weight of gelatin, based on the $Al_2O_3$ equivalent of said aluminum chloride, with ammonia until from about 65 to 85% of said aluminum chloride is neutralized.

6. A process of producing stable alumina sols substantially free of gel particles which comprises treating an aqueous solution of from about 1 to 10% by weight of aluminum chloride, calculated as $Al_2O_3$, and from about 0.5 to 25% by weight of gelatin, based on the $Al_2O_3$ equivalent of said aluminum chloride, with ammonia until from about 65 to 85% of said aluminum chloride is neutralized, and heating the resulting mixture after the treatment with ammonia until a sol which is substantially free of gel particles is obtained.

7. A stable, acidic alumina aquasol containing about 1 to 10% by weight of hydrated alumina, calculated as $Al_2O_3$, from about 5 to 38% by weight of a salt selected from the group consisting of ammonium chloride and sodium chloride and from 1 to 25% by weight of gelatin based on the $Al_2O_3$ content of said aquasol.

8. A process of producing stable, acidic alumina sols which comprises treating an aqueous solution of from about 1 to 10% by weight of aluminum chloride, calculated as $Al_2O_3$, and from about 0.5 to 25% by weight of gelatin, based on the $Al_2O_3$ equivalent of said aluminum salt, with an alkaline substance selected from the group consisting of ammonia, sodium bicarbonate, sodium carbonate and sodium hydroxide, until from about 65 to 88% of said aluminum chloride is neutralized.

9. A process of producing an acidic alumina aquagel which is colloidally dispersible in water with simple stirring at an $Al_2O_3$ content below 10% by weight, which comprises treating an aqueous solution of above 10% but not more than 30% by weight of aluminum chloride, calculated as $Al_2O_3$, and from 1 to 25% by weight of gelatin, based on the $Al_2O_3$ equivalent of said aluminum chloride, with an alkaline substance selected from the group consisting of ammonia, sodium bicarbonate, sodium carbonate and sodium hydroxide in amounts sufficient to cause gelation of said solution and to provide a final pH below 7 but insufficient to provide an irreversible gel, and then allowing said solution to gel.

10. A process of producing an acidic alumina aquagel which is colloidally dispersible in water with simple stirring at an $Al_2O_3$ content below 10% by weight, which comprises treating an aqueous solution of more than 10% but not more than 30% by weight of aluminum chloride, calculated as $Al_2O_3$, and from 1 to 25% by weight of gelatin, based on the $Al_2O_3$ equivalent of said chloride, with ammonia until from about 65 to 85% of said aluminum chloride is neutralized and then allowing said solution to gel.

11. A process which comprises treating an aqueous solution of from 1 to 30% by weight of aluminum chloride, calculated as $Al_2O_3$, and from about 0.5 to 25% by weight of gelatin, based on the $Al_2O_3$ equivalent of said aluminum chloride, with an alkaline substance selected from the group consisting of ammonia, sodium bicarbonate, sodium carbonate and sodium hydroxide, said gelatin being dissolved in said solution prior to the completion of said treatment with said alkaline substance, until from about 65 to 88% of said aluminum chloride is neutralized, whereby an acidic product is obtained, said acidic product being characterized in that it is a stable, acidic alumina sol when the solution contains 10% and less by weight of the aluminum chloride, calculated as $Al_2O_3$, but otherwise gels to form an acidic alumina aquagel which is colloidally dispersible in water at an $Al_2O_3$ content below 10% by weight by simple stirring.

12. A process of producing stable alumina sols which comprises first treating an aqueous solution of from about 1 to 10% by weight of aluminum chloride, calculated as $Al_2O_3$, and from about 0.5 to 25% by weight of gelatin, based on the $Al_2O_3$ equivalent of said aluminum chloride, with sodium carbonate and then with sodium bicarbonate, the amount of sodium carbonate and sodium bicarbonate used being sufficient to neutralize only about 65 to 85% of said aluminum chloride.

13. A process as in claim 12, but further characterized in that the solution is heated after the addition of sodium carbonate and also after the addition of sodium bicarbonate until a sol which is substantially free of gel particles is obtained.

References Cited in the file of this patent

UNITED STATES PATENTS

| | | |
|---|---|---|
| 2,085,129 | Stoewener | June 29, 1937 |
| 2,163,922 | Stoewener | June 27, 1939 |
| 2,166,868 | Jones | July 18, 1939 |
| 2,590,833 | Bechtold et al. | Apr. 1, 1953 |